June 6, 1939.  S. FARBER  2,161,509
VALVE LOCK
Filed Feb. 16, 1938
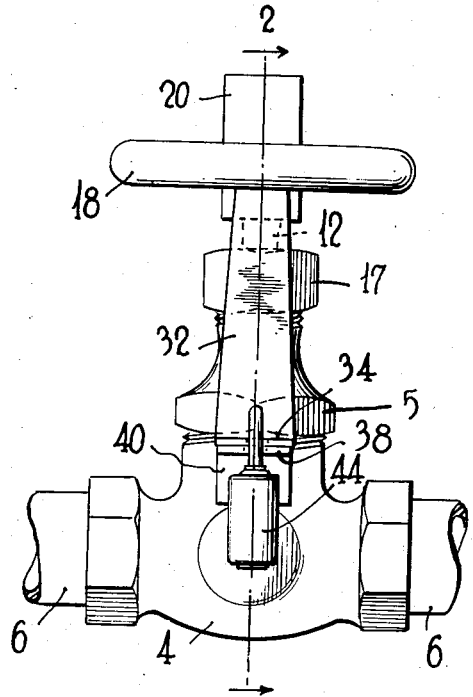
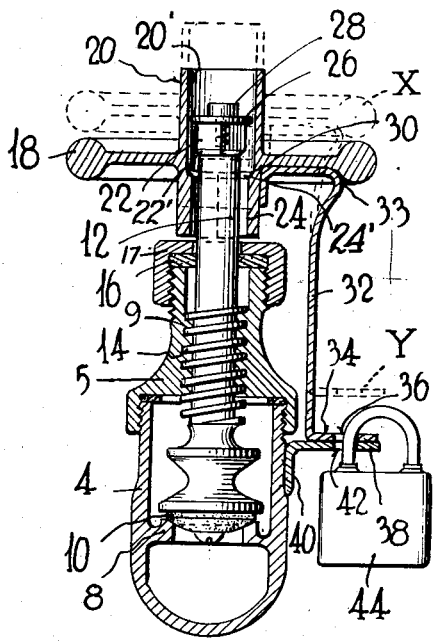
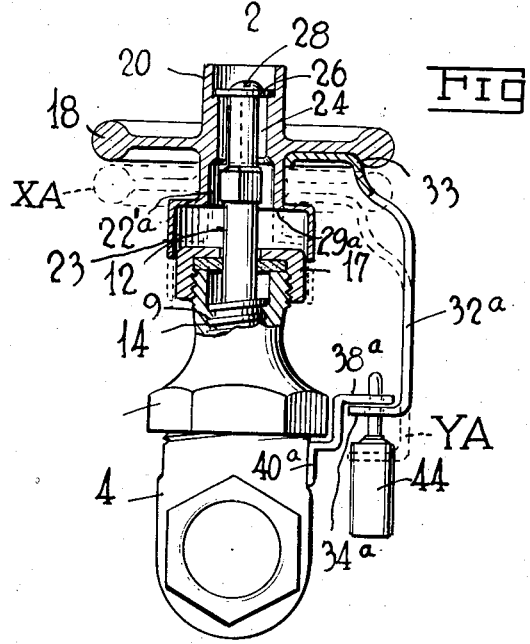
Inventor
Samuel Farber,
By Bailey & Carson
Attorneys Patented June 6, 1939

2,161,509

UNITED STATES PATENT OFFICE 2,161,509

VALVE LOCK

Samuel Farber, Newport, Ky.

Application February 16, 1938, Serial No. 190,863

7 Claims. (Cl. 70—180)

The primary object of my invention is to provide a valve which may be locked in any position for preventing unauthorized use or tampering.

The problem of preventing unauthorized use of valves has been long outstanding. Wherever a valve may be found in a location accessible to the public, there is found a potential source of loss or danger to the proprietor of the fluid controlled by the valve.

In the present invention a valve handle is always held by the stem, but axially movable therealong between two positions. In one of these positions, the handle engages the stem, and in the other position the handle is free to rotate independently of the stem. Also, in this freely rotatable position, an arm attached to the handle is carried to a position where it may be locked to a flange integral with the casing.

It is apparent, then, that the object has been accomplished by providing a valve which can be turned to any position within its range, and then locked in that position.

Among my other objects are to provide a valve both inexpensive enough so that the initial cost will soon be more than repaid by the savings resulting therefrom, and one so simple that a mere child may operate it, provided he has the key. Repair work on this valve or lock is of the most elementary order and, with few exceptions, standard parts can be used.

Other objects will appear in the following specification and drawing, in which:

Fig. 1 is a side elevation showing the assembly in locked position;

Fig. 2 is a cross-section through Fig. 1 along the lines 2—2 and looking in the direction of the arrows; and Fig. 3 is a view similar to Fig. 2 but showing a modification.

As shown in Figs. 1 and 2, a valve casing 4 is interposed between the pipes 6. In conventional manner, a seat 8 is provided for the valve 10. The valve 10 is controlled by a stem 12 having threads 14, engaging the internal threads 9 in the casing top 5, the stem 12 projecting through the usual packing 16 and nut 17 beyond the casing top 5.

Near the outside end of the stem 12 is a handle 18, which may be a lever, knob, or wheel as shown. One fact of great importance about the handle 18 is that it is mounted on a sleeve 20 which, in turn, is engaged around the stem 12. The stem 12 is provided with a non-round head 22 which, for purposes of illustration, may be square, as shown.

Internally, a portion 20' of the sleeve 20 is round and larger than the square head 22 on the stem so that the sleeve 20 may rotate freely around the head 22 when that portion 20' surrounds it. Another internal collar portion 24 of the sleeve 20 is of a complementary non-round contour with, and slightly larger than, the head 22. When the square collar portion 24 of the sleeve has been axially slid to the position shown in dotted lines in Fig. 2 with its non-round surfaces surrounding those of the head 22, the head 22 and the collar 24 are engaged so that when the handle 18 is turned, the stem 12 is also turned and the valve 10 is driven towards an open or closed position.

The lower edges of the head 22 is beveled, as shown at 22', and the upper edge of the collar portion 24 is beveled in a complementary manner, as indicated at 24' so that facile engagement between the head and collar may be executed without wear or "dogging" of the edges.

A washer 26 is held to the top of the stem 12 by a screw 28 for preventing the handle from moving any farther upwardly along the stem than allowed by the engagement of the shoulders 30 of the collar 24 with the washer 26.

It is preferred that the head of the screw 28 be not provided with the conventional groove, so that it will be impossible to insert any ordinary tool to loosen the assembled device, or to turn the stem 12 in any degree when the handle 18 is disengaged therewith. This screw 28 may be assembled by raising the stem 12 slightly beyond the normal "open" position of the valve 10, sliding the sleeve 20 as far down over the stem 12 as possible, and then inserting the screw 28 tightly with a wrench.

An arm 32, which preferably is formed from a strip of metal, is attached integrally and rigidly to the handle 18, as shown at 33. The free end of the arm 32 has a lower portion 34 which has an eyelet 36.

A second arm 38 is attached integrally and rigidly with the valve casing, as shown at 40. Where the casing has a top portion 5, as shown, it is preferred that the second arm 38 be attached to the lower part 4, for reasons which will be explained later. An eyelet 42 is provided in the second arm opposite the eyelet 36 so that a padlock 44 may be used to fasten the two arms together. The arm 32 is of such length that when the handle 18 and collar 24 are axially in position of non-engagement with the head 22, the lower end of the arm is sufficiently near the arm 38 so as to be secured thereto with an ordinary padlock 44. When the handle 18 has been axially moved to engage the collar 24 with the head 22, the ends of the arms are, of course, substantially away from each other.

A modification embodying the invention is shown in Fig. 3, wherein the square head 22'a on the stem is situated substantially away from the top end of the stem, so that the handle 18 and collar 24 are moved axially down the stem 12 to engage the head 22'a and, of course, axially up the stem to bring the internally round sleeve portion 29'a radially opposite the head 22'a so that it may be rotated independently thereof. A skirted portion 23 is provided beneath the internally round sleeve portion 22a so that the stem 12 cannot be turned by pliers or the like when the handle is locked. In this modification, the arm 32a is bent around so that the lower portion 34a is beneath the arm 38a.

As shown in all the figures, the sleeve 20 is sufficiently long to cover the head 22, no matter which axial position is selected, so that it is impossible to tamper with the valve when locked by grabbing the head with any tool. As shown in Fig. 2, the stem is, likewise, completely covered by the sleeve when the handle is locked.

In operation, the padlock 44 is removed from the arms 32 and 38, the handle is grasped and slid axially along the stem until engagement between the head on the stem and the collar on the sleeve is felt by a slight rotative test. This position is shown by the dotted lines X and Y, for the handle and arm, and by dotted lines XA and YA in the modification. Then the handle 18 is rotated to drive the valve 10 to the desired position. After this, the handle 18 is axially slid back to its former position, where it can be freely rotated to bring the eyelets 36 and 42 opposite each other, after which the padlock 44 may be replaced.

By locking the handle to the lower part of the casing 4, it is impossible to take the valve apart, since all intermediate portions are bracketed between the locked arms.

From the foregoing specification, it is seen that the new device denotes a distinct advance in the art, since it can be locked either in the opened or closed, or any intermediate, position. It is inexpensive to manufacture, immediately applicable to present systems, and foolproof in operation.

Let it be understood that all obvious modifications, such as changing the contours of the head 22 and collar 24, the forms, locations, and methods of attachment, types of locks, and types of valve structure, are clearly within the scope of my invention, which I have described and now claim.

I claim:

1. In combination with a valve, an operating member therefor, a handle mounted on said member and movable only between two positions along said member, connecting means between said member and handle whereby in one of said positions movement of said handle moves said member while in the other of said positions, said handle is freely movable with respect to said member, and means for locking said handle against movement relative to said member.

2. A valve, including a casing, an operating stem, and a handle for rotating said stem to operate said valve, said handle being axially slidable along said stem between two positions, said handle, in the first of said positions being in engagement with said stem so as to turn therewith, and in the second of said positions being rotatable independently of said stem, and means for locking said handle to said casing in the second of said positions.

3. A valve as set forth in claim 2, said means comprising an arm rigidly secured to said handle, another arm rigidly secured to said casing, and a lock for securing the free ends of said arms together.

4. A valve as set forth in claim 1, including a casing for said valve, said last-mentioned means comprising an element rigid with said handle, another element rigid with said casing, and means for locking both elements together.

5. A valve as set forth in claim 1, said means including an arm rigid with said handle, and means for locking said arm to said casing whereby said arm is prevented from being axially moved to the first of said positions.

6. A valve, including a casing, an operating stem extending externally from said casing, said stem having a portion thereof substantially square in cross-section, and a handle having a sleeve-like portion, one part of which is also substantially square in cross-section and slightly larger than the square portion of said stem, another section of which is substantially round and larger in diameter than the diagonal across said square portion, said handle being axially movable between two positions of operative engagement and disengagement along said stem, the square section of said sleeve being radially opposite the square portion of said stem in the first of said positions whereby, when said handle is rotated, said stem is also rotated to operate said valve, the round section of said sleeve being radially opposite the square portion of said stem when said handle is in the second position, an arm comprising a strip of metal with an eyelet therein, rigid with said handle and a second arm also comprising a strip of metal with an eyelet therein rigid with said casing, whereby the eyelets in the arms are moved substantially away from and towards each other, respectively, as the handle is moved operatively to engage and disengage said stem so that the said arms may be locked against relative movement therebetween by an ordinary padlock passed through the eyelets.

7. A valve as set forth in claim 2, in which the stem at the portion which is engaged by the handle is of irregular cross-section and the handle has an opening of complementary cross-section, said handle having a sleeve portion surrounding the irregular portion of said stem in both axial positions of the handle.

SAMUEL FARBER.